Jan. 26, 1965    J. HERMANN ETAL    3,167,275
SPOILER DEVICE
Filed March 31, 1961

Inventors
Joachim Hermann
Wilhelm Kirsch
Heinz Donat
By McGlew and Toren
Attorneys

United States Patent Office 3,167,275
Patented Jan. 26, 1965

3,167,275
SPOILER DEVICE
Joachim Hermann, Munich, Wilhelm Kirsch, Ottobrunn, near Munich, and Heinz Donat, Munich, Germany, assignors to Bölkow-Entwicklungen Kommanditgesellschaft, Ottobrunn, near Munich, Germany
Filed Mar. 31, 1961, Ser. No. 99,776
Claims priority, application Germany, Apr. 5, 1960, B 57,352
7 Claims. (Cl. 244—14)

This invention relates to spoilers for aerodynamically guided missiles that is to say, to steering devices, which influence like rudders, the flight path of the missile and include spoiler plates which are moved by an electromagnetic force.

In aerodynamic control mechanisms of the type with which the present invention is concerned, there are generally provided two armatures which cooperate with two electromagnets which are alternately excited. In order to provide for parallel guidance of a spoiler plate, to enable it to separate or spoil the air flow along the wing surface of the missile steered by action of said spoilers, it was heretofore the practice to provide spring units which were disposed in parallelogram fashion in a manner to effect guiding of the spoiler plate. Such spring units were screwed or riveted to the spoiler plate as well as to a mounting plate carrying the electromagnets.

A disadvantage in such structures, besides their heavy weight, was that their operations required the expenditure of an excessive amount of power. In addition, in attempting to enable repeatedly reliable movements of the spoiler plate, or plates, extremely close tolerances had to be adhered to in manufacturing and assembling the many parts comprising the prior art aerodynamic control mechanisms. But, unfortunately, such closely held tolerances often cause jamming of the various interconnected parts and, as a consequence, a non-functioning or malfunctioning of the spoiler plate, or plates, occurs so that an uncontrollable and unpredictable maneuvering of the aerodynamic craft ensues.

A further disadvantage is that the spring operation of the spoiler plate limited the frequency of switching of said plate and further led to the resonant vibration so that an uncontrollable movement of the missile ensued.

In accordance with the present invention there is provided a spoiler assembly which is comprised of only a few operable parts or elements which are manufactured by a stamping operation and are easily mounted in their assembled positions. The arrangement includes an armature mounted between two electromagnetic actuators and which extends through a slot in the spoiler plate. Straps are provided on each side of the spoiler plate and they extend to the electromagnetic mounting. Spring means are provided to bias the spoiler plate centrally to permit easy operation thereof backwardly and forwardly when the armature is vibrated by alternating current being passed through the electromagnetic actuators. The construction is very simple and extremely light in weight, and only a small amount of force is required to move the spoiler plate. The movement can be accomplished at high switching frequency.

In a preferred arrangement, the spoiler plate is suspended by four clips or straps which may be slipped over projecting edges of a mounting base or plate which supports the electromagnetic actuators, after they are inserted through slots in the spoiler plate. The suspension of the spoiler plate by means of said four straps under tensile stress is statically determined, as one of these four straps is always without positive connection. The holding straps are not influenced by power transmission produced by actuating a magnet to alternately swing an anchor plate from one side to the other. Distortions and disturbances caused during the regular working condition of the device are positively and safely avoided due to the tolerances prevailing or due to the high switching frequency, and can thus be easily overcome.

A further feature of the invention is that the parts are held within a housing having two separate portions which are joined together by screw members which also function to position the electromagnetic actuators within the housing. Springs are provided within the housing to hold the spoiler plate in its zero or neutral position. These springs are supported and affixed to connections or projections which are integral with the housing and extend at substantially right angles outwardly from each side of the spoiler plate. The spoiler plate is advantageously provided at its edges or ends with bent down straps of projections which cooperate with adjustable screws which are carried by the housing. By rotating the screws an adjustment of the maximum deflection of the spoiler plate may be obtained in a positive as well as a negative direction.

Accordingly, it is an object of this invention to provide an improved spoiler construction.

A further object of this invention is to provide an improved device for operating a spoiler plate for aerodynamically controlled missiles which includes a mounting base for disposing two electromagnetic sections in opposition and for holding an armature plate therebetween, and wherein the mounting base includes strap means extending to a spoiler plate to support the plate in contact with the armature plate which is vibrated upon actuating the electromagnets with alternating electric current.

A further object of the invention is to provide a spoiler structure having an air pressure spoiler plate which is electromagnetically operated.

A further object of the invention is to provide a spoiler plate which is electromagnetically operated and moved in parallel guidance arrangement including guide bands connected to the mounting for the electromagnets and connected at widely spaced locations to the spoiler plate, and with a central armature plate disposed between the electromagnets and movable upon actuation thereof for effecting movement of the spoiler plate.

A further object of the invention is to provide a spoiler structure which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter, in which there is illustrated and described a preferred embodiment of the invention.

Figure 1:
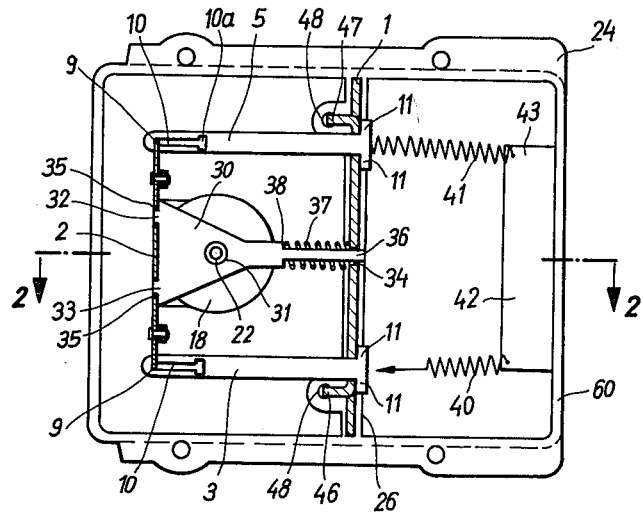
FIG. 1 is a section taken on the line 1—1 of FIG. 2 of a spoiler constructed in accordance with the invention.

Referring to the drawings in particular, there is provided a housing generally designated 60 having upper and lower separable parts 23 and 24 which are arranged together to enclose the operating parts of a spoiler mechanism constructed in accordance with the invention. The lower portion 24 of the housing includes an internal raised boss portion 62 which cooperates with a similar raised boss portion 64 on the upper housing portion 23 to form supporting bases for a magnetic mounting plate generally designated 2. Magnetic mounting plate 2 includes a itral U-shaped portion 66 having an upper plate 12
ich bears against the boss 64 and a lower plate 13
ich bears against the boss 62. Electromagnets 18 and
 having an outer spool or coil and a soft iron core,
 arranged in opposition and held on the plates 13
d 12, respectively, at spaced locations on each side
 an anchoring plate or armature 30 which is disposed
rebetween. When housing portions 23 and 24 are
embled together, screws 21 and 22 are threaded
enings of a sleve member extending in through the
unting plates 12 and 13 and central opening 31 in the
chor plate 30. The screws 21 and 22 are threaded
vardly from opposite sides and effectively hold the parts
their related positions.

The anchoring plate or armature 30 includes a tri-
gular portion which is disposed between the electro-
gnets 18 and 20 and which includes a base with
ending tab portions 32 and 33 which fit into rectangular
enings 35 defined in the central portion 66 of the mount-
; plate 2. The anchoring plate or armature 30 further
ludes a flat central portion of widened dimension 38
d a laterally elongated end portion 36 which extends
o a central small-sized opening 34 provided at the
iter of the spoiler plate 1.

The spoiler plate 1 is made of a synthetic material or
light metal, the plate 1 being disposed with openings
 and 27 in housing portions 24 and 23, and connected
 means of straps 3 and 4 at vertically aligned and
tically spaced positions on one side and straps 5 and
 at vertically aligned and vertically spaced positions
 an opposite side. The straps 3, 4, 5 and 6 are pro-
led with widened ends 11 and the central portion of
:h strap is threaded through openings provided at the
:tangular corners of the plate 1. The opposite ends
 each of the straps 3, 4, 5 and 6 are provided with
 elongated slot 10 terminating in an inner widened
ening 10a which is adapted to fit over outstanding lugs
formed at the end of arm 70 provided at the end of
ension 72 from the central section 66 of the mounting
te 2. The upper portions of the lugs 9 are of a size
 fit within the slot 10a and the strap may be moved
wnwardly on the lug to a narrow dimensioned portion
 permit the slot portion 10 to be slid therealong. In
s manner the straps 3, 4, 5 and 6 may be easily assem-
d to both the spoiler plate 1 and the mounting plate 2.
A compression spring 37 is disposed between the
iler plate 1 and the widened shoulder 38 of the arma-
e 30. The plate 1 is therefore guided for parallel
vement by the straps 3, 4, 5 and 6 which are ad-
ntageously located at rectangular positions in respect
 the central portion 36 of the armature. When the
nature is actuated by excitation of the electromagnets
 and 20, the spoiler plate 1 is reciprocatably moved.
 addition to the spring 37, there is provided a spring
 and 41 at each side in alignment with straps 3, 4 and
 6, respectively. The springs extend between end por-
ns 43 of the housing 60 and the spoiler plate 1 to hold
 in a neutral position indicated in FIG. 2. The springs
, 40 and 41, as seen in FIG. 2, extend in a single plane
ich intersects the spoiler plate 1 at right angles to the
t 34 provided for the central portion 36 of the arma-
re 30.

Figure 2:
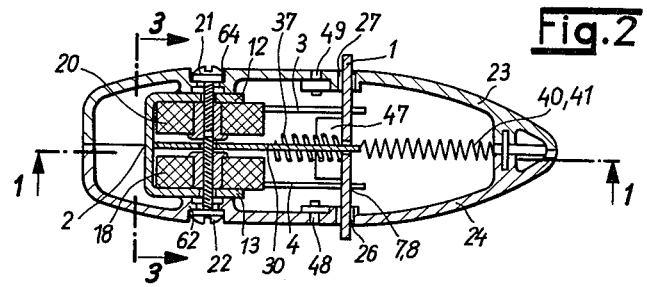
FIG. 2 is a section taken on the line 2—2 of FIG. 1.
Figure 3:
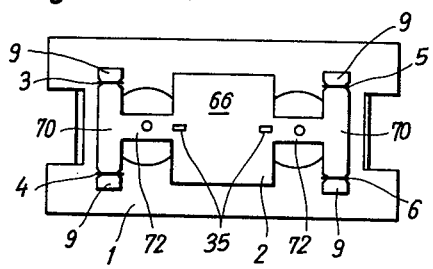
FIG. 3 is a section taken on the line 3—3 of FIG. 2.

The spoiler plate 1 which spoils the air flow over the
ng is further provided at its near end or near side
th extensions or ribs 46 and 47 which extend inwardly
 a direction toward the electromagnetic actuators 18
d 20 at substantially right angles to the spoiler plate.
ese in-turned portions are disposed adjacent set screws
 and 49 which may be turned to effect a maximum
flection or angular displacement of the spoiler plate 1
 respect to its position indicated in FIG. 2. This may
 accomplished in either upward or downward direc-
ns.

The electromagnets 18 and 20 are disposed so that the
les which confront the armature plate 30 are of similar
polarity. During the alternating current excitement of
the electromagnets the armature plate 30 is moved in
respect to FIG. 2, once in an upward direction and thence
again in a downward direction and in particular, con-
trary to the force which the springs 40 and 41 exert via
the spoiler plate on the armature plate 30. Simultaneous-
ly, during the switch-over position of the electromagnets,
a residual magnetic flux which remains from the previous
switching effect is then eliminated and destroyed. There-
fore, the switch-over time is considerably reduced. If
the electromagnets 18 and 20 become de-energized, then
the springs 40 and 41 retract the spoiler plate 1 again
into its position of rest as indicated in FIG. 2.

While a specific embodiment of the invention has been
shown and described in detail to illustrate the application
of the invention principles, it will be understood that the
invention may be embodied otherwise without departing
from such principles.

What is claimed is:

1. A spoiler assembly, arranged within a housing hav-
ing a receiving slot, comprising a mounting plate, electro-
magnets disposed in opposition on said plate, an arma-
ture disposed between said electromagnets for actuation
thereby, a spoiler plate arranged in the housings receiving
slot and extending at a substantially right angle relation-
ship to said armature plate and having a central slot into
which said armature plate extends, strap members con-
nected to said spoiler plate at four symmetrical corner
locations in respect to said central slot and slidably coupled
with said mounting plate, said strap members being slid-
ably movable relative to said mounting plate, and spring
means situated on two opposing sides of said spoiler plate
for biasing said spoiler plate and said armature into said
right angle relationship.

2. A spoiler structure according to claim 1, wherein
said spoiler plate is maintained in said right angle relation-
ship relative to said armature plate by spring means
which are connected to one side of the spoiler plate, re-
mote from the armature plate, and to projections of the
housing, said spring means extending in a plane which
intersects with the spoiler plate at a right angle and lies
in the same plane as said armature plate.

3. A spoiler assembly comprising: a pair of separable
wall sections defining, when juxtaposed, a housing, each
said wall section including a slotted recess, said slotted
recesses defining, when said wall sections are juxtaposed,
a receiving slot in the housing, said wall sections each
having an opening therethrough; a mounting plate situated
within the housing, said mounting plate including two con-
nected spaced-apart plate portions, each plate portion in-
cluding an opening therethrough; two electromagnets,
each including a central opening therethrough, said elec-
tromagnets being disposed between said spaced-apart plate
portions with their central openings in alignment with said
openings in said spaced-apart plate portions and said open-
ings in said wall sections; screw means disposed in the
openings in said wall sections, said spaced-apart plate
portions and said central openings for securing said elec-
tromagnets with said mounting plate and said wall sec-
tions said wall sections being secured by said screw means
in juxtaposition to define the housing; an aperture arma-
ture plate situated between said electromagnets for actua-
tion thereby, said screw means passing through the aper-
ture in said armature plate; a spoiler plate disposed in
said receiving slot of the housing aligned at a right angle
relationship to said armature plate and having a central
slot therethrough into which said armature plate extends;
strap members connected to said spoiler plate at four
corners of said spoiler plate symmetrically situated with
respect to said central slots, said strap members being
slidably coupled with said mounting plate; and, spring
means for biasing said spoiler plate and said armature
plate to said right angle relationship.

4. A spoiler assembly, according to claim 1, wherein
said mounting plate includes apertures and lateral extensions, wherein said spoiler plate includes apertures, wherein each said strap has a tab portion at one end and a slot through its opposite end, said tab portions of the straps being received in the apertures in said spoiler plate and said slotted ends of said straps receiving said lateral extensions of the mounting plates, wherein said armature plate includes a widened portion having tabs extending outwardly from one side of said widened portion and a narrowed portion extending outwardly in an opposite direction from said extending tabs, said extending tabs of the armature plate being received in the apertures of the mounting plate and said narrow portion extending into said spoiler plate's central slot, and wherein said spring means includes a compression spring encompassing said narrow portion and extending between said spoiler plate and said widened portion of the armature plate.

5. A spoiler assembly comprising: a mounting plate including two spaced-apart plate portions integral with a central plate portion situated between the spaced-apart plate portions, said central plate portion having spaced-apart lug portions thereon; two electromagnets, each secured to a different one of said spaced-apart plate portions, both electromagnets being situated between said spaced-apart plate portions in opposing relationship; an armature plate disposed between said electromagnets and extending outwardly therefrom; a substantially rectangular spoiler plate including a central slot therethrough and additional slots therethrough at the rectangular corner location of said spoiler plate symmetrically arranged with respect to said central slot, said armature including a portion extending into said central slot; and elongated strap members each having a tab at one end thereof and a slot through an opposing end thereof, said tabs of said strap members being received in said additional slots of the spoiler plate, said slotted ends of said strap members receiving said lug portions of said central plate portion for sliding movement of said strap members with respect to said mounting plate.

6. A spoiler assembly comprising: a housing including a receiving slot therethrough; a flat spoiler plate including a central aperture and a plurality of additional apertures which are symmetrically arranged with respect to said central aperture, said spoiler plate being situated in said receiving slot; mounting means secured within the housing, said mounting means including a plurality of lug means; a plurality of longitudinal guide members extending between said additional apertures and said lug means, each said guide member being slidably coupled at a lug means and with said spoiler plate through an additional aperture thereof to enable limited longitudinal movement of said guide members; tension spring means connected between housing and one face of said spoiler plate; electromagnets secured to said mounting means; and armature plate operable by said electromagnets, said armature plate being coupled at one end thereof to said mounting means and having another end thereof extending into the spoiler plate's central aperture; and compression spring means carried by said armature plate, one end of said compression spring bearing against said spoiler plate and extending in the plane of said armature plate.

7. A spoiler assembly according to claim 6, wherein said mounting means includes legs which extend in the direction of the armature plate and support said electromagnets on opposing faces of said armature plate, and wherein said housing comprises two separable half shells of synthetic material, each half shell being apertured for receiving screw means for fastening the half shells in juxtaposition and securing said mounting plate and electromagnets within the housing defined by the juxtaposition and securing said mounting plate and electromagnets within the housing defined by the juxtapositioned half shells.

References Cited in the file of this patent
FOREIGN PATENTS

| | | |
|---|---|---|
| 797,933 | France | May 6, 1936 |
| 836,555 | France | Oct. 17, 1938 |